United States Patent [19]
Eder

[11] 3,871,216
[45] Mar. 18, 1975

[54] DYNAMOMETER APPARATUS
[75] Inventor: Heinz Eder, Krefeld, Germany
[73] Assignee: Hottinger Baldwin Messtechnik GmbH, Darmstadt, Germany
[22] Filed: June 23, 1972
[21] Appl. No.: 265,620

[30] Foreign Application Priority Data
June 28, 1971 Germany.......................... 2132012

[52] U.S. Cl.................................. 73/141 A, 338/5
[51] Int. Cl. .............................................. G01l 1/22
[58] Field of Search...................... 73/141 A; 338/5

[56] References Cited
UNITED STATES PATENTS
3,033,031  5/1962  Gruber................................. 73/140
3,216,245  11/1965  Seed ................................. 73/141 A
3,365,689  1/1968  Kutsay..................................... 338/5
3,600,942  8/1971  Brendel............................. 73/141 A
3,706,349  12/1972  Paelian et al. ................. 73/141 A X
3,712,123  1/1973  Laimins ............................. 73/141 A Primary Examiner—Charles A. Ruehl
Attorney, Agent, or Firm—Wolfgang G. Fasse; Willard W. Roberts

[57] ABSTRACT

A low-height strain-gaged load cell, of short generally cylindrical form, includes a central rigid hub and a surrounding rigid annular rim, the hub and rim being joined by radial spokes, at upper and lower positions, which are integral with the hub and rim and which comprise residual portions of staggered closed-bottom holes machined in opposite directions into material between the hub and rim; strain gages applied to the spokes respond to their deformations induced by loadings effective between the hub and rim.

9 Claims, 3 Drawing Figures

DYNAMOMETER APPARATUS

BACKGROUND OF THE INVENTION

The present invention relates to improvements in dynamometer apparatus of the load-cell type, and, in one particular aspect, to novel and improved low-profile strain-gaged load cells wherein a deformable body of material having a high modulus of elasticity is relatively thin in directions transverse to the forces applied to it for measurement and has strain-responsive elements on unique stabilizing cross-pieces left between intersecting material cut-outs.

In prior load cells of the type including both a central and a surrounding spaced load-transmitting structure, it has been known to remove some of the intermediate material and, thereby, to leave remaining integral elements which are somewhat more deformable, within elastic limits, and can be gaged for purposes of translating the loading into related electrical measurement signals. One such arrangement appears in U.S. Pat. No. 3,196,676, where the sensing elements are disposed radially opposite one another and are fashioned by way of circular machining operations. In another, as disclosed in U.S. Pat. No. 3,037,178, a plurality of radial shear-sensing elements are formed by an circular array of boreholes parallel with the central axis of the cell.

Flatness, or a so-called "low profile" is especially desirable for measurement units which should not take up much vertical space, as in the case of weighing systems wherein the cells are disposed between a scale platform and an underlying support. Diminished height can be attended by poor lateral stability, however, particularly when the sensing elements are to be relatively weak for purposes of sensing relatively small loads accurately. Although shear-type cells can provide good lateral stability, this may require that the sensing elements be in longer lengths and thicker cross-sections than one would wish, and it is sometimes further preferable to sense bending rather than shear. The present invention has been aimed at development of an especially flat and compact load cell which would nevertheless exhibit high lateral stability and readily accommodate the placements of strain gages. It is aided in these respects by the formation of two closely-spaced parallel arrays of ribs or spokes, having stabilizing characteristics akin to those of two parallel diaphragms, and the mechanical difficulties which would be foreseen in attempting to fabricate such an integral unit are avoided by machining two groups of blind recesses, from both sides of a relatively flat plate member, in a staggered relationship which involves their intersections and the accompanying formation of residual cross-pieces which can be gaged to serve as the strain-measuring ribs or spokes.

SUMMARY OF THE INVENTION

Accordingly, it is one of the objects of the present invention to provide novel and improved precision load cells of substantially flat and compact proportions which are highly sensitive and possess a high degree of structural integrity and resistance to spurious forces other than in intended measurement directions, and which further lend themselves to low-cost manufacture.

A further object is to provide a low-profile load cell in which lateral stability is promoted by spaced parallel arrays of gaged cross-pieces remaining between rigid load-transmitting elements upon machining of intersecting staggered blind holes from opposite sides of a body of elastically-deformable material.

By way of a summary account of practice of this invention in one of its aspects, a substantially flat plate or body of material having a high modulus of elasticity is provided with two groups of recesses leading from the two sides toward but short of the respectively opposite sides, each group preferably being symmetrically arranged at the same radial distance about a central axis of the plate, and the two groups being angularly staggered in relation to one another such that they intersect. The remaining cross-pieces extend radially between a relatively rigid central hub portion and a relatively rigid outer annular rim portion, and electrical-resistance strain gages are bonded to accessible surfaces of at least some of these cross-pieces. In a further embodiment, the central hub portion is itself separated into two parts in direction transverse to the central axis, and the measured forces are transmitted through the resulting two hub parts, along that axis.

BRIEF DESCRIPTION OF THE DRAWINGS

Although the aspects and features of this invention which are considered to be novel are expressed in the appended claims, further details as to preferred practices and as to the further objects and features thereof may perhaps be most readily comprehended through reference to the following description taken in connection with the accompanying drawings, wherein:

DESCRIPTION OF THE PREFERRED EMBODIMENTS

Figure 1:
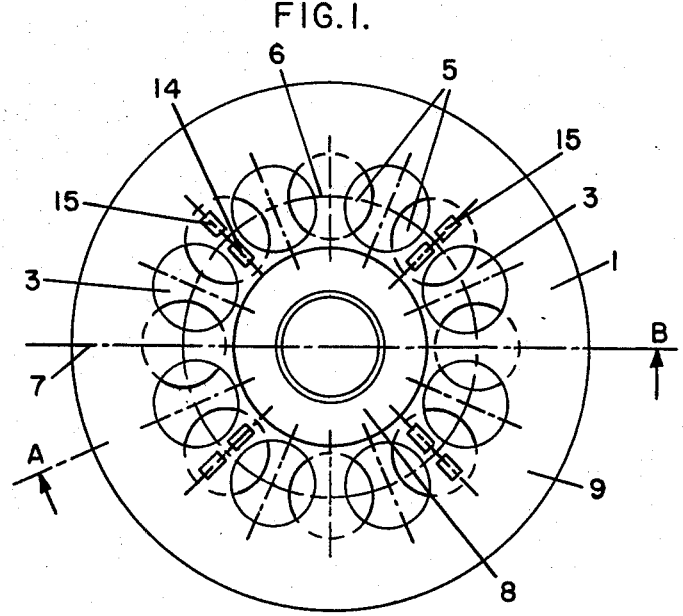
FIG. 1 is a top plan view of a load-cell body unit in accordance with the present invention.
Figure 2:
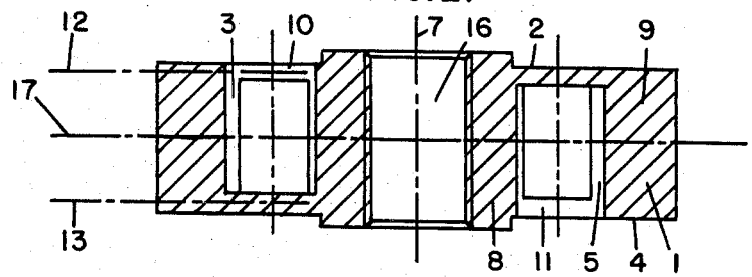
FIG. 2 provides a cross-sectioned side view of the same cell taken along section lines A–B of FIG. 1.

In the load-cell construction appearing in FIGS. 1 and 2, the substantially flat, or short cylindrical, plate or body 1 comprises the usual high-modulus-of-elasticity material, such as a steel, which is commonly employed in such devices. Recesses 3, which are in the nature of blind holes, lead from one side or top plane, 2, toward the inside of the plate but short of the opposite side, 4, by a predetermined distance. Similarly, a group of recesses 5 lead from that opposite side, 4, toward the inside of the plate but short of the upper side 2 by a predetermined distance. Preferably, the angularly-spaced recesses are all of the same circular cross-section and are centered at the same distance from the central axis 7 along the dashed-line circle 6; however, the recesses 3 from the top side 2 of the plate are angularly staggered in relation to recesses 5, by half the dividing distance between centers of the recesses 5.

Because of the aforesaid relationships between the recesses 3 and 5, integral but relatively thin and narrow cross-pieces or ribs, 10 and 11, remain between the relatively thick and rigid central core or hub 8 and surrounding outer annular rim 9. The cross-pieces run radially in the manner of spokes, substantially in two spaced parallel planes, 12 and 13. Electrical resistance strain gages, such as those designated by numerals 14 and 15, are mounted by bonding, preferably in pairs as shown, on at least some of the cross-pieces 10 and 11, gages 14 being on the inside and gages 15 being on the outside of the central locus identified by circle 6. In accordance with techniques well known in the art, these gages are connected into bridge circuitry which then yields electrical output signals related to the forces exerted between the hub 8 and rim 9. Hub 8 may be hollowed, as shown in FIG. 2, and may be internally tapped, within its bore 16, to accommodate a screw bolt; with the plate 1 supported via its rim 9 and a to-be-measured force applied via such a screw bolt, cross-pieces 10 and 11 are subjected to bending strains and the associated strain gages 14 and 15 in turn translate these strains into related electrical measurements of the force. In the illustrated symmetrical arrangement of hub, rim, recesses and cross-pieces, there is a resulting desirable homogeneous distribution of strain, and, force applied to the hub downwardly in FIG. 2 will cause the top surfaces of crosspieces 10 to exhibit tension outside of circle 6 and compression inside of that circle.

Figure 3:
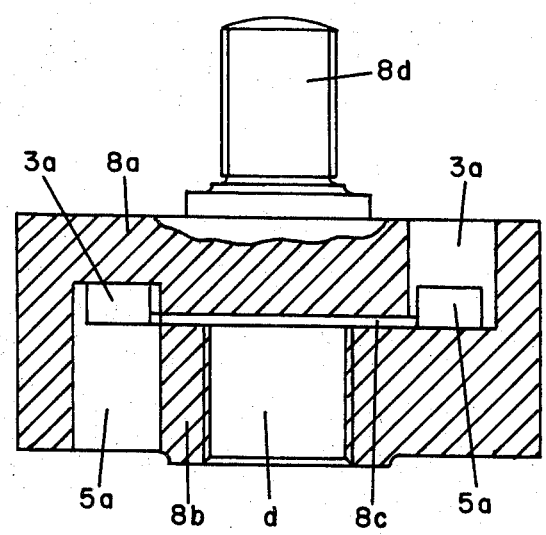
FIG. 3 provides a partly cross-sectioned side view, comparable to that of FIG. 2 of a modified version of the load cell.

The embodiment represented in FIG. 3 involves a feedback of the centrally-induced force, as made possible by the separation of the central core or hub into two axially-separated parts 8a and 8b. In that arrangement, the counter-force or reaction is also introduced essentially along the central axis, rather than by way of the outer rim, and thus there is a resulting symmetrical passage of forces through planes of both the upper and lower spokes or cross-pieces. Separation of the upper and lower hub parts 8a and 8b is readily accomplished at 8c, from the inside, through boring d.

If the upper cross-pieces or ribs alone are gaged for measurement of the applied forces, the upper recesses, 3a, can penetrate less or be of lesser depth than the lower recesses, 5a. In that way, the lower cross-pieces are caused to be stronger and the counter-force is more directly coupled between the outer rim and a screw bolt set into the tapped boring d. A male type force-applying knob or button, 8d, of conventional type, is shown associated with the upper hub part 8a, for application of loading forces.

It should be understood that the specific practices and preferred embodiments herein referred to have been offered by way of disclosure rather than limitation, and that various modifications, additions and substitutions may be effected by those skilled in the art without departure from these teachings. By way of example, the shape, number and size of the cross-pieces may be modified by appropriate shaping and arrangement of the recesses, and by selecting different dividing distances between the recesses. The recesses may be made of depths appropriate to the forces to be measured, and the top and bottom surfaces of the body may be non-parallel, or tapered. The cross-pieces may be gaged in shear, or for torsional responses, and gaging may appear on only one or both of the top and bottom sets of cross-pieces. The body unit may be other than circular, and may, for example, be substantially linear. It is therefore aimed in the appended claims to embrace all such variations as fall within the true spirit and scope of this invention.

What I claim as new and desire to secure by Letters Patent of the U.S. is:

1. A dynamometer apparatus of the load cell type comprising a substantially cylindrical plate forming an elastic deformation body having a central axis, said plate having a first outer surface and a second outer surface, a central hub in said plate and a circumferential rim in said plate, a plurality of first blind holes extending from said first outer surface into said plate, said first blind holes being spaced from each other between said hub and rim, said first blind holes forming first ribs extending substantially radially and connecting said hub to said rim adjacent to said first outer surface, a plurality of second blind holes extending from said second outer surface into said plate but staggered relative to said first blind holes, said second blind holes also being spaced from each other between said hub and rim to form further ribs extending substantially radially and connecting said hub to said rim adjacent to said second outer surface, and strain sensing means secured to selected ones of said ribs.

2. The apparatus according to claim 1, wherein said first and second blind holes are arranged on respective circles extending centrally around said hub.

3. The apparatus according to claim 2, wherein said circles have the same diameter.

4. The apparatus according to claim 2, wherein said first and second blind holes are angularly evenly spaced from each other along their respective circles.

5. The apparatus according to claim 1, wherein all blind holes are circular in cross section.

6. The apparatus according to claim 1, wherein all blind holes extend with their longitudinal axis in parallel to said central axis of the load cell.

7. The apparatus according to claim 1, wherein said hub comprises two sections separated by a gap intermediate its ends, said gap extending substantially perpendicularly to said central axis.

8. The apparatus according to claim 7, wherein one section of said central hub comprises means for applying to the cell forces to be measured and wherein the other hub section comprises means for applying counterforces thereto.

9. The apparatus according to claim 1, wherein said blind holes extending from on surface have a depth less than the blind holes extending from the opposite surface.

* * * * *